United States Patent [19]

von Sivers

[11] Patent Number: 4,709,778
[45] Date of Patent: Dec. 1, 1987

[54] VEHICLE DRIVE UNIT

[75] Inventor: Rolf von Sivers, Rutesheim, Fed. Rep. of Germany

[73] Assignee: Dr. Ing. h.c.F. Porsche Aktiengesellschaft, Fed. Rep. of Germany

[21] Appl. No.: 733,785

[22] Filed: May 14, 1985

[30] Foreign Application Priority Data

May 14, 1984 [DE] Fed. Rep. of Germany ....... 3417815

[51] Int. Cl.$^4$ .............................................. B60K 5/12
[52] U.S. Cl. .................... 180/292; 180/69.1;
180/233; 180/300; 248/634
[58] Field of Search ........... 180/291, 292–297,
180/299, 300, 75.2, 69.1, 247, 233, 248, 249,
250; 123/2, 195 C, 192 R, 198 E; 267/138;
248/634, 632, 638, 659

[56] References Cited

U.S. PATENT DOCUMENTS

| 1,788,878 | 1/1931 | Lee | 248/634 |
|---|---|---|---|
| 2,004,749 | 6/1935 | Dillon | 180/233 |
| 3,998,290 | 12/1976 | Sivers et al. | 180/292 |
| 4,300,649 | 11/1981 | Sakata | 180/297 |
| 4,405,027 | 9/1983 | Enokimoto et al. | 180/292 |
| 4,559,846 | 12/1985 | Cochran et al. | 180/247 |

FOREIGN PATENT DOCUMENTS

| 754099 | 2/1945 | Fed. Rep. of Germany | 180/233 |
|---|---|---|---|
| 1924101 | 11/1970 | Fed. Rep. of Germany | 180/292 |
| 512050 | 11/1937 | United Kingdom | 180/233 |
| 525475 | 8/1940 | United Kingdom | 180/55 |

Primary Examiner—John J. Love
Assistant Examiner—Eric. D. Culbreth

[57] ABSTRACT

A vehicle drive unit placed in front of the back of the vehicle for a single axle and four wheel drive is provided in which the unit includes a combustion engine and a transmission with wheel axle drive differentials a and central differential or transfer case. A drive shaft is carried in a support and the support is rigidly connected to the second differential. The combustion engine is supported at the vehicle body and at the transmission by numerous elastic bearings which vibrationally isolate the same from one another. The engine is rigidly connected to the support for the drive shaft. A transmission shaft with low torsional rigidity is provided between the combustion engine and the transmission with this transmission shaft connected to the engine and transmission inertia masses to provide a damping effect on torque vibrations.

13 Claims, 6 Drawing Figures

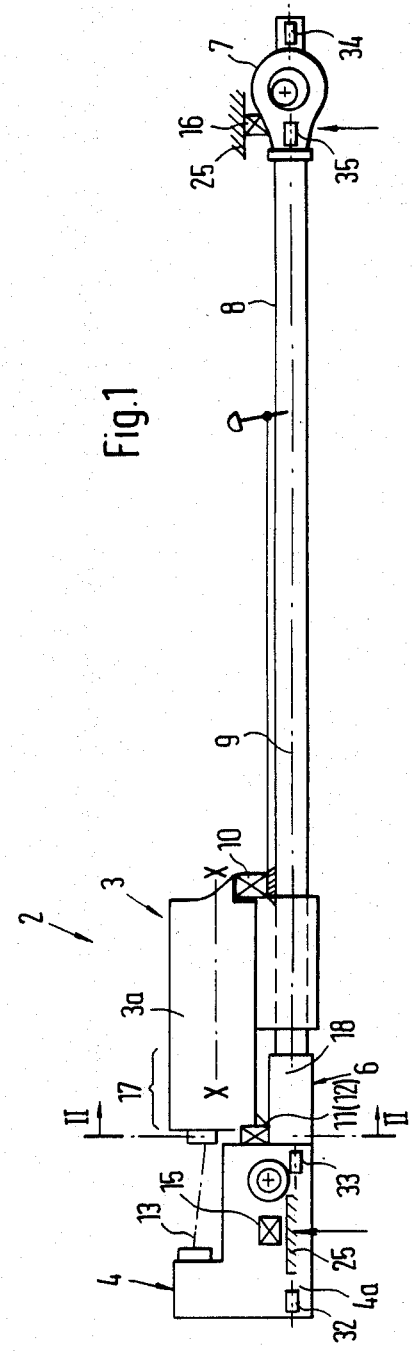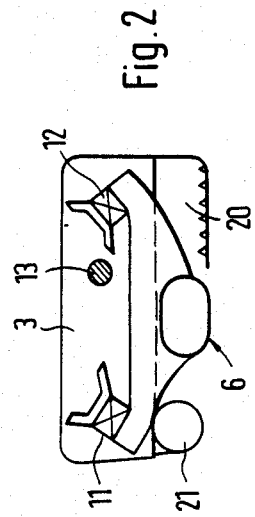

VEHICLE DRIVE UNIT

BACKGROUND AND SUMMARY OF THE INVENTION

The present invention relates to a vehicle with a forwardly or rearwardly disposed drive unit for a single axle and four wheel drive. More particularly, the present inventionr elates to a vehicle drive unit including a combustion engine, a transmission, and a drive shaft connected to wheel drive differentials, a transfer case or middle differential.

Vehicles with all wheel drive are known (Magazine Auto Motor and Sport, Apr. 20, 1983, pages 4 to 7) in which the forwardly or rearwardly disposed drive unit is rigidly connected to a pipe-like longitudinal support in which a drive shaft leading to the differentials is borne. These vehicles have direct transmission and the transmission is rigidly affixed to the combustion engine and the entire unit is positioned in succession in the longitudinal direction of the vehicle. With respect to vibration, such rigidly coupled connections of the combustion engine and the transmission, on the one hand, and the combustion engine and the support, on the other hand, have the disadvantage that the vibration causing engine creates additional vibrations on the drive units (support, drive shaft, transmission) which leads to increased stresses on the individual units and causes a higher noise level. Because of the rigid connection of all components of the drive unit, special tuning of the drive units, e.g. tuning the combustion engine to lower frequencies with respect to the driving support, is not possible for achieving an improvement in driving comfort.

The known configuration of positioning the combustion engine as an extension of the transmission results in disadvantages with respect to the relatively long length of the structure because a larger structural area is required and a pliable and torsionally strong combination has to be created. Furthermore, the distribution of weight with such a configuration is inefficient with respect to the axial load distribution, particularly in rear engine and all wheel drive vehicles.

An object of the present invention is to create a vehicle of the aforementioned category in which the individual components of the drive unit are isolated from each other with respect to vibration effects and the components of the drive unit can be shifted in location. Furthermore, the individual components of the unit can be of smaller structural length, requiring less area, and affording an optimal distribution of weight. Within certain limits, this design will also enable an adjustable repositioning of the engine, depending upon the structural design of the vehicle.

According to the present invention, an improved vehicle drive unit is provided which isolates all of the individual components with respect to vibration effects. This vibration isolation is accomplished by utilizing numerous elastic bearings and a flexible shaft between the engine and the transmission.

The advantages obtained with the present invention relate to the fact that the vibration de-coupling or isolation of the combustion engine from the other drive units as a result of a separate bearing from the support and the transmission enables an optimal low-frequency tuning of the engine in harmony with the drive unit and the chassis. In addition, a beneficial isolation of the combustion engine from vibrations on the drive unit and on the chassis can be achieved. As a result of this design, a favorable noise level and vibration level can be achieved and this allows for a thinner, and lighter, support.

The engine is connected to the transmission by a transmission shaft which has elastic intermediate elements, such a couplings, to give the shaft low torsional rigidity and to allow it to be pliable. As a result, a variable positioning of the combustion engine with respect to the transmission is possible within limits. For favorable results, the engine can be positioned close to the differential. This configuration also results in an optimal distribution of load on the vehicle axles in such a way that the combustion engine is aligned with the vehicle axle, on the one side, and the clutch, the transmission, and the auxiliary units are aligned with the vehicle axle, on the other side. This configuration on the vehicle axle is particularly advantageous for a rear end positioning of the drive nit.

According to certain preferred embodiments of the present invention the combustion engine, when seen in the direction of travel, is placed in front of the transmission and a rear section of the engine partially covers the transmission housing. This results in a shorter structurallength than in known configurations with rigidly connected engine and transmission which are sequentially arranged, when viewed in the direction of travel.

The de-coupled design of the individual components of the drive unit makes it structurally simpler for placing the auxiliary units in a smaller area which has better drive results. As a result of this design, fewer temperature problems occur near the transmission and away from the semi-encapsulated combustion engine. The clutch, for example, is separated from the engine and placed directly at the gear shift box and the driving or flywheel is at the transmission input, largely preventing transmission vibration.

Further objects, features, and advantages of the present invention will become more apparent from the following description when taken with the accompanying drawings which show, for purpose of illustration only, embodiments in accordance with the present invention.

BRIEF DESCRIPTION OF THE DRAWINGS

FIG. 1 is a schematic lateral view of a drive unit for a vehicle with all wheel drive and a drive unit, whereby the engine, when viewed in the direction of travel, is placed at the front of the combination support which also forms the axle steerage support constructed in accordance with a preferred embodiment of the invention;

FIG. 2 is a cross section along line II—II of FIG. 1;

DETAILED DESCRIPTION OF THE DRAWINGS

Figure 3:
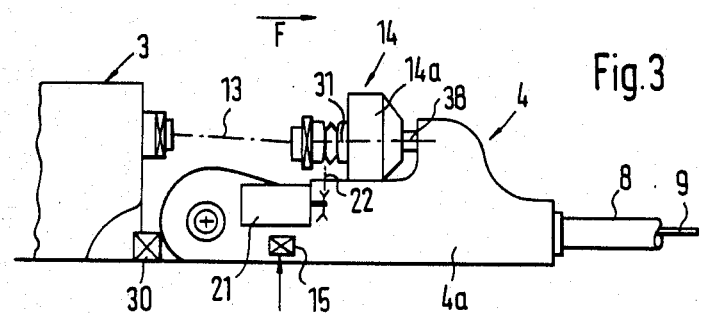
FIG. 3 is a schematic laterial view showing a design of a drive unit constructed in accordance with a preferred embodiment of the invention in which the engine viewed in the direction of travel, is placed behind the gear change box.

The vehicle has a drive unit 2 which includes a combustion engine 3 with a housing 3a, a gear shift transmission 4, a first differential 5, a central differential or transfer case 6 and a second differential 7. The connection of the gear shift transmission 4 to the second differential 7 is fixed by means of a pipe-like support 8 in which a drive shaft 9 is carried. The drive unit 2 can be placed in the front or back and be used for single axle or four wheel drive wherein either the front or rear axle is driven for single axle drive according to various contemplated embodiments of the invention.

The combustion engine 3 in accordance with the design shown in FIG. 1, is de-coupled or vibrationally isolated from the rest of the drive units to a maximum extent by means of elastic bearing elements 10, 11, 12. The gear shift transmission 4 is connected to the support 8 which forms a single unit with the second differential 7. A torque-transmitting shaft 13 which is connected to a gear shaft 31 by activating a clutch 14 serves as the drive (FIG. 3). The transmission shaft 13 has one or ore elastic couplings which makes the shaft 13 pliable with low torsional rigidity so that shifts of the components of the drive unit can be performed and irregularities of the engine crank gear are kept away from the gear shaft 31.

The drive unit components are supported on the body structure of the vehicle by at least two bearings 15 at the housing 4a of the transmission 4 and by another bearing 16 at the housing of the second differential 7. Wheel guides (not shown) can be placed, for example, at the housing 4a of the transmission. Appropriate bearings and supports 32, 33, 34, 35 are provided for this purpose.

In accordance with the design shown in FIG. 1, the combustion engine 3 is placed on a horizontal plane (X—X) above the support 8 and is almost on the same axis as the transmission 4. A section 17 of the combustion engine 3 is positioned above an extension 18 of the housing of the transmission 4 or of the transfer case/central differential 6 connected to the transmission 4. The combustion engine 3 is supported on a console 19 of the transmission housing 4a whereby the console 19 has lateral bearings 11, 12. The combustion engine 3 is also supported at the support 8 by means of the elastic bearing 10. Alongside the support 8 below the combustion engine 3 there is an oil sump 20 on one side and auxiliary units 21 such as the generator, etc. on the other side. Wheel guides, which are not shown, are held in bearings 32, 33 of the transmission housing 4a as well as at the housing of the second differential 7 in bearings 34, 35.

According to one preferred embodiment of the invention, the combustion engine is designed as an under-floor engine in the vehicle.

In another embodiment of the present invention depicted in FIG. 3, the combustion engine 3 viewed in the direction of travel, is placed behind the transmission 4 and is supported on the structure (which is not shown) by elastic elements 30 at the housing 4a of the transmission 4. The clutch 14 with a revolving mass or flywheel 14a is positioned close to the transmission 4 and is connected with a driving shaft 38. The auxiliary units 21 are mounted below the transmission shaft 13 in such a way that this shaft 13 generates auxiliary drive by means of auxiliary transmission elements 22 interconnecting with drive gear shaft 31.

Figure 4:
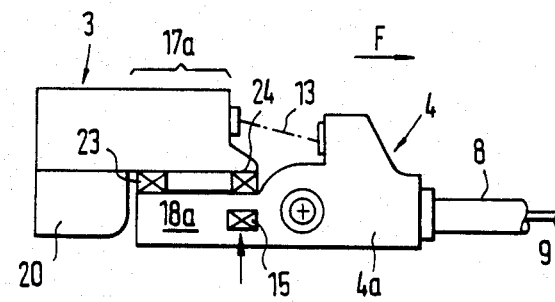
FIG. 4 is a schematic lateral view showing another embodiment of the invention with a drive unit and in which the engine is adjacent to the transmission.
Figure 5:
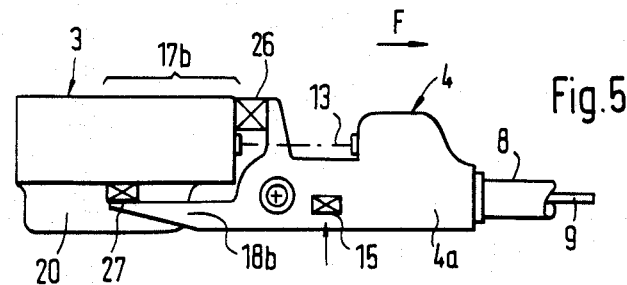
FIGS. 5 and 6 are schematic lateral views showing another embodiment of the invention's designs for a positioning of the combustion engine either totally or partially at the transmission.
Figure 6:
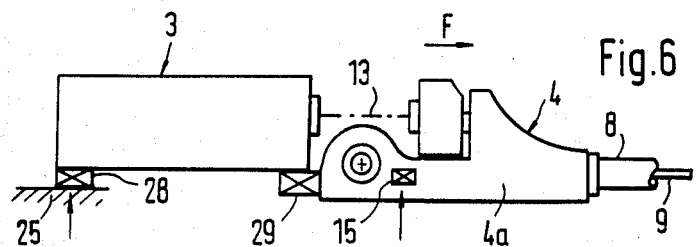

The embodiments of the present invention shown in FIGS. 4, 5, and 6 correspond to principle to the embodiment shown in FIG. 3 and described above, with a combustion engine 3 located behind the transmission, when viewed in the direction of travel. The design shown in FIG. 4 shows the combustion engine 3 as in the case of the design shown in FIG. 1, above the transmission housing 4a over a relatively long area 17a with the combustion engine 3 supported on the transmission housing 4a by numerous bearings 23, 24. The oil sump 20 is provided as an extension of the transmission housing 4a below the combustion engine 3 and preferably forms a closed-off area with the lower surface of the transmission housing 4a.

Another embodiment shown in FIG. 5 has the combustion engine 3 covering the transmission housing 4a over a section 17b with the combustion engine 3 supported by an upper bearing 26 and a lower bearing 27 below the former at the transmission housing 4a and wherein the shaft 13 extends past an arm of the transmission housing 4a.

The combustion engine 3 in the design shown in FIG. 6 is axially attached to the transmission housing 4a and is supported on one side at the transmission housing by numerous elastic bearings 29 and on the other side at the vehicle body either on a support 25 or the like, by bearings 28. In certain preferred embodiments, the combustion engine is designed as an underfloore ngine in the vehicle.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed is:

1. A vehicle drive unit comprising:
    a combustion engine supported at the vehicle structure by elastic bearing means,
    a transmission,
    a transmission shaft drivingly connecting the engine and the transmission,
    a transfer case drivingly connectible with the transmission,
    first and second differentials drivingly connectible with the transmission and transfer case,
    a drive shaft for drivingly connecting the transmission with the second differential, said drive shaft being supported at a support member,
    said support member being rigidly connected with the transmission,
    said elastic bearing means including first and second elastic bearing support means,
    said first elastic bearing support means arranged between the combustion engine and the support member for vibrationally isolating the combustion engine with respect to the support member for the drive shaft,
    said second elastic bearing support means arranged between the combustion engine and the transmission for vibrationally isolating the combustion engine with respect to the transmission, and
    said transmission shaft exhibiting low torsional rigidity and being associated with inertial masses in such a manner as to provide a damping effect on torque transfer induced vibrations.

2. The vehicle drive unit of claim 1, wherein the first elastic bearing support means includes at least one elastic bearing supporting the combustion engine at the support member and wherein the second elastic bearing support means includes at least two elastic support bearings provided at a transmission housing for the transmission.

3. The vehicle drive unit of claim 1, wherein the transmission includes a transmission housing and a housing extension and wherein the combustion engine is positioned on a horizontal plane above the support member and is disposed substantially on the same axis as the the transmission, and wherein a section of the combustion engine is positioned above the housing extension of the transmission housing.

4. A vehicle drive unit according to claim 3, further comprising wheel guide bearings, wherein the second differential includes a housing, and wherein the wheel guide bearings are connected to the second differential housing and the transmission housing.

5. A vehicle drive unit according to claim 3, wherein the housing extension surrounds the transfer case in the area where the transfer case is drivingly connectibel with the transmission.

6. The vehicle drive unit of claim 1, further comprising an oil sump and auxiliary units which are positioned below the combustion engine at about the same horizontal plane as the support member wherein the oil sump is placed on one side of the support member and the auxiliary units are placed onthe other side of the support member at the engine housing of the combustion engine.

7. The vehicle drive unit of claim 1, wherein the combustione ngine is designed as an underfloor engine in the vehicle.

8. A vehicle drive unit according to claim 1, said elastic bearing means further comprising a third and fourth elastic bearings upport means, wherein the transmission has a transmission housing, and wherein the combustione ngine, when viewed in the direction of travel, is positioned behind the transmission, said third elastic bearing support means being arranged between the transmission and the vehicle body, and said fourth elastic bearing support means being arranged between the second differential and the vehicle body.

9. A vehicle drive unit supported at a vehicle body of a motor vehicle comprising:
   a combustion engine,
   a transmission,
   a transmission shaft drivingly connecting the engine and the transmission,
   a transfer case drivingly connectible with the transmission,
   first and second differentials drivingly connectible with the transmission and transfer case,
   a drive shaft for drivingly connecting the transmission with the second differential, said drive shaft being supported at a support member,
   said support member being rigidly connected with the transmission,
   first elastic bearing means for supporting and vibrationally isolating the engine with respect to the transmission, said first elastic bearing means being arranged between the engine and the transmission, and
   said transmission shaft exhibiting low torsional rigidity and being associated with inertial masses in such a manner as to provide a damping effect on torque transfer induced vibrations, and
   further comprising second elastic bearing means for supporting and vibrationally isolating the vehicle drive unit with respect to the vehicle body,
   wherein said first elasti bearing means includes at least two elastic support bearings,
   said second elastic bearing means including at least one elastic support bearing for supporting and vibrationally isolating the transmission with respect to the vehicle body and being arranged between the transmission and the vehicle body, and
   said second elastic bearing means including at least one elasti support bearing for supporting and vibrationally isoalting the second differential with respect to the vehicle body and being arranged between the second differential and the vehicle body,
   further comprising third elastic bearing means for supporting and vibrationally isoalting the engine with respect to the support member, said third elastic bearing means being arranged between the engine and the support member.

10. A vehicle drive unit according to claim 9, said third elastic bearing means including at least one elastic support bearing.

11. A vehicle drive unit according to claim 10, said transmission incuding a transmission housing and a housing extension, wherein the engine is positioned on a horizontal plane above the support member and on substantially the same axis as the transmission, and wherein a section of the engine is arranged above the housing extension of the transmission housing.

12. A vehicle drive unit according to claim 11, wherein the housing extension surrounds the transfer case in the area where the transfer case is drivingly connectible with the transmission.

13. A vehicle drive unit supported at a vehicle body of a motor vehicle comprising:
   a combustion engine,
   a transmission,
   a transmission shaft drivingly connecting the engine and the transmission,
   a transfer case drivingly connectible with the transmission,
   first and second differentials drivinglyc onnectible with the transmission and transfer case,
   a drive shaft for drivingly connecting the transmission with the second differential, said drive shaft being supported at a support member,
   said support member being rigidly connected with the transmission,
   first elastic bearing means for supporting and vibrationally isolating the engine with respect to the transmission, said first elastic bearing means being arranged between the engine and the transmission, and
   said transmission shaft exhibiting low torsional rigidity and being associated with inertial masses in such a manner as to provide a damping effect on torque transfer induced vibrations, and
   further comprising second elastic bearing means for supporting and vibrationally isolating the vehicle drive unit with respect to the vehicle body,
   wherein said first elastic bearing means includes at least two elastic support bearings,
   said second elastic bearing means including at least one elastic support bearing for supporting and vibrationally isolating the transmission with respect to the vehicle body and being arranged between the transmission and the vehicle body, said second elastic bearing means including at least one elastic support bearing for supporting and vibrationally isolating the second differential with respect to the vehicle body and being arranged between the second differential and the vehicle body wherein the engine is arranged behind the transmission when viewed in the direction of vehicle travel, further comprising an oil sump and auxiliary units which are positioned below the combustion engine at about the same horizontal plane as the support member, wherein the sump is placed on one side of the support member and the auxiliary units are placed on the other side of the support member at the engine housing of the combustion engine.

* * * * *